(12) United States Patent
Oh (10) Patent No.: US 10,647,154 B1
(45) Date of Patent: May 12, 2020

(54) WHEEL END TEMPERATURE SENSOR AND TEMPERATURE MONITORING SYSTEM FOR HUB BEARING INCLUDING THE SAME

(71) Applicant: ICSN, Inc., Corona, CA (US)

(72) Inventor: James Sangyoung Oh, Corona, CA (US)

(73) Assignee: ICSN, Inc., Corona, CA (US)

( * ) Notice: Subject to any disclaimer, the term of this patent is extended or adjusted under 35 U.S.C. 154(b) by 0 days.

(21) Appl. No.: 16/202,100

(22) Filed: Nov. 28, 2018

(51) Int. Cl.
| | |
|---|---|
| *F16C 19/52* | (2006.01) |
| *G01K 13/08* | (2006.01) |
| *B60B 27/00* | (2006.01) |
| *B60B 7/00* | (2006.01) |
| *F16C 41/00* | (2006.01) |

(52) U.S. Cl.
CPC ........ *B60B 27/0068* (2013.01); *B60B 7/0013* (2013.01); *F16C 19/525* (2013.01); *F16C 41/00* (2013.01); *G01K 13/08* (2013.01); *F16C 2233/00* (2013.01); *F16C 2326/02* (2013.01); *F16C 2326/20* (2013.01)

(58) Field of Classification Search
CPC .... F16C 19/525; F16C 41/00; F16C 2326/02; F16C 2326/20; F16C 2233/30; G01K 13/08; G01K 13/02; B60Q 1/00; B60B 7/0013; B60B 27/001; B60B 27/0068
USPC ................ 384/448, 544, 589, 605–606, 624; 301/105.1, 108.1; 116/216; 184/6.4; 340/449
See application file for complete search history.

(56) References Cited

U.S. PATENT DOCUMENTS

| | | | | |
|---|---|---|---|---|
| 6,776,261 | B2 * | 8/2004 | Eriksen .................... | F16C 19/52 184/6.4 |
| 7,547,077 | B2 * | 6/2009 | Melberg .................... | G01K 5/62 116/216 |
| 7,845,217 | B2 * | 12/2010 | Dodd ......................... | B60B 3/16 301/105.1 |
| 8,223,006 | B2 * | 7/2012 | Wilson .................. | B60C 23/003 301/5.1 |
| 9,389,149 | B2 * | 7/2016 | Paulin ...................... | B60B 3/165 |
| 2006/0023985 | A1 * | 2/2006 | Gradu ...................... | B60B 27/00 384/563 |
| 2008/0018445 | A1 * | 1/2008 | Shimura .............. | B60C 23/0408 340/442 |
| 2012/0326398 | A1 * | 12/2012 | Kobayashi ............ | F16C 33/723 277/637 |
| 2013/0035834 | A1 * | 2/2013 | Couch ...................... | B60C 23/20 701/70 |
| 2016/0207353 | A1 * | 7/2016 | Mock .................. | B60B 27/0005 |
| 2018/0156691 | A1 * | 6/2018 | Ehrhardt ............... | F16C 33/664 |
| 2018/0297399 | A1 * | 10/2018 | Matsuda ................. | B60C 23/02 |

FOREIGN PATENT DOCUMENTS

| | | | | |
|---|---|---|---|---|
| DE | 102006035703 | A1 * | 6/2009 | ............. B61D 43/00 |
| EP | 3385089 | A4 * | 12/2018 | ......... B60B 27/0005 |
| WO | WO-0218878 | A2 * | 3/2002 | ............. G01D 5/145 |

* cited by examiner

*Primary Examiner* — Marcus Charles
(74) *Attorney, Agent, or Firm* — Revolution IP, PLLC (57) ABSTRACT

A wheel end temperature monitoring system, includes: a wheel end temperature sensor configured to detect the temperature of a hub bearing of a wheel of a trailer; and a main unit configured to receive a signal of the wheel end temperature sensor and transmit the received signal to the outside.

15 Claims, 6 Drawing Sheets

WHEEL END TEMPERATURE SENSOR AND TEMPERATURE MONITORING SYSTEM FOR HUB BEARING INCLUDING THE SAME

BACKGROUND OF THE INVENTION

1. Field of the Invention

The present invention relates to a wheel end temperature sensor that may help safe driving of a vehicle by measuring the temperature of the hub bearing and detecting overheating of the hub bearing, and a temperature monitoring system for a hub bearing including the same.

2. Description of the Related Art

As the technologies for vehicles have developed and the interests in the safety of the vehicles have increased, safe driving of the vehicles has been pursued by attaching various sensors to the vehicles.

Various sensors, such as engine check sensors, door opening detecting sensors, and tire pressure measuring sensors, have been introduced.

The engine check sensor is a sensor that detects an abnormality and informs the driver of the detected abnormality if the abnormality occurs while the engine check sensor monitors a driving state of the engine and the like, and the door opening detecting sensor is a sensor that detects a state of a door and informs the driver of the state of the door to prevent generation of a safety accident when the door is opened or is not fully closed.

Further, the tire pressure measuring sensor is a sensor that informs the driver of an air pressure of a tire to prevent generation of an accident when the air pressure of the tire decreases to a preset value or less while the tire pressure measuring sensor continues to monitor the air pressure of the tire.

Meanwhile, a trailer is used to transport containers for transportation of goods over land.

The trailer is an apparatus that is connected to a rear side of a truck or the like such that containers may be loaded on the trailer and is pulled by a driving force of the truck.

The trailer travels a long distance for a long time while carrying containers of high weight.

Meanwhile, wheels for driving are provided in the trailer. The wheels are provided to be rotatable about a shaft though hub bearings.

However, as described above, if the trailer travels a long distance at a high speed for a long time while carrying containers of high weight, a considerable load may be applied to the hub bearings.

Further, the hub bearings may be defected, such as damaged or fused as the temperatures of the hub bearings increase to high temperature if the trailer is driven in a high load environment, for example, in which foreign substances penetrate into the hub bearings or oil in the hub bearings is leaked or become insufficient, which may cause an accident.

SUMMARY OF THE INVENTION

The present invention has been made in an effort to solve the above-mentioned problems, and provides a wheel end temperature sensor that may prevent generation of an accident by damage to a hub bearing in advance by always measuring the temperature of the hub bearing and a temperature monitoring system for a hub bearing.

The effects of the present invention are not limited thereto, and other unmentioned effects of the present invention may be clearly appreciated by those skilled in the art from the following descriptions.

In accordance with an aspect of the present invention, there is provided a wheel end temperature monitoring system, including: a wheel end temperature sensor configured to detect the temperature of a hub bearing of a wheel of a trailer; and a main unit configured to receive a signal of the wheel end temperature sensor and transmit the received signal to the outside.

The wheel end temperature monitoring system may further include: a relay antenna configured to relay the signal of the temperature sensor to the main unit.

The main unit may transmit the received signal of the wheel end temperature sensor to at least any one of a vehicle gauge plate, a registered signal reception device, a registered mobile phone, or an external control room.

The wheel end temperature sensor may include: an insertion part mounted to pass through a hub cap, extending to an oil filling space between the hub cap and a housing in a state in which the insertion part is mounted on the hub cap, and having a board accommodating space in the interior thereof; a thermal conduction cap provided at an end of the insertion part, formed of a metallic material, and contacting an outside and an inside of the board accommodating space; a cap part coupled to an upper side of the insertion part and configured to close a board accommodating space; and a sensor board accommodated in the board accommodating space of the insertion part, configured to measure temperature through heat conducted through the thermal conduction cap, and configured to transmit the measured temperature to the outside.

According to another aspect of the present invention, there is provided a hub bearing assembly including: a hub bearing disposed to be concentric with a shaft and provided at an end of the shaft; a bearing provided between the shaft and the hub housing; a hub cap provided at an outer end of the housing and sealing a space between the bearing and the housing, which is filled with oil; and a wheel end temperature sensor mounted to pass through the hub cap and configured to measure the temperature of the oil in the space between the housing and the hub cap.

A mounting hole, through which the wheel end temperature sensor is mounted to pass, may be formed in the hub cap.

The wheel end temperature sensor may include: an insertion part mounted to pass through a hub cap, extending to an oil filling space between the hub cap and a housing in a state in which the insertion part is mounted on the hub cap, and having a board accommodating space in the interior thereof; a thermal conduction cap provided at an end of the insertion part, formed of a metallic material, and contacting an outside and an inside of the board accommodating space; a cap part coupled to an upper side of the insertion part and configured to close a board accommodating space; and a sensor board accommodated in the board accommodating space of the insertion part, configured to measure temperature through heat conducted through the thermal conduction cap, and configured to transmit the measured temperature to the outside.

In accordance with another aspect of the present invention, there is provided a wheel end temperature sensor including: an insertion part inserted into a hub cap, extending to an oil filling space between the hub cap and a housing in a state in which the insertion part is inserted into the hub cap, and having a board accommodating space in the interior thereof; a thermal conduction cap provided at an end of the insertion part, formed of a metallic material, and contacting an outside and an inside of the board accommodating space; a cap part coupled to an upper side of the insertion part and configured to close a board accommodating space; and a sensor board accommodated in the board accommodating space of the insertion part, configured to measure temperature through heat conducted through the thermal conduction cap, and configured to transmit the measured temperature to the outside.

An end of the insertion part may be opened and the opened end of the thermal conduction cap may be coupled to be sealed.

The sensor board may include: a main board located in the board accommodating space of the insertion part; a temperature sensor mounted on the main board; a battery board coupled to the main board and on which a battery holder is mounted; and an antenna mounted on any one of the main board and the battery board and configured to transmit the temperature information measured by the temperature sensor to the outside.

The temperature sensor may contact the thermal conduction cap.

An epoxy may be filled in the interior of the board accommodating space, into which the sensor board is inserted.

A gyro sensor configured to detect rotation and RPM may be further included in the sensor board.

A control unit configured to control the temperature sensor, an antenna, and a gyro sensor may be further included in the sensor board, and the control unit may select an operating mode according to the RPM measured by the gyro sensor or the temperature measured by the temperature sensor.

The wheel end temperature sensor may be operated in a stop state mode in which the temperature information measured by the temperature sensor is transmitted once per first period of time when the RPM measured by the gyro sensor is a preset RPM or lower.

The wheel end temperature sensor may be operated in a driving state mode in which the temperature information measured by the temperature sensor is transmitted once per second period of time when the RPM measured by the gyro sensor is a preset RPM or higher.

The wheel end temperature sensor may be operated in an alarm state mode in which the temperature information measured by the temperature sensor is transmitted once per third period of time when the temperature measured by the temperature sensor is a preset temperature or higher.

The summary described above as well as a detailed description of preferred embodiments of the present invention, which will be described below, will be understood more clearly when they are read with reference to the accompanying drawings. The preferred embodiments are illustrated in the drawings for the purpose of exemplifying the present invention. However, it should be understood that the present invention is not limited to the disposals and means illustrated.

BRIEF DESCRIPTION OF THE DRAWINGS

Hereinafter, exemplary embodiments of the present invention for achieving the effects will be described in detail with reference to the accompanying drawings.

DETAILED DESCRIPTION OF THE INVENTION

Hereinafter, exemplary embodiments of the present invention for realizing the objects in detail will be described with reference to the accompanying drawings. In a description of the embodiments of the present invention, the same titles and reference numerals are used for the same configurations and an additional description thereof will be omitted.

In the embodiments of the present invention, it will be described as an example that a temperature monitoring system for a hub bearing of the present invention is mounted on a trailer that transports a container. Of course, the present invention is necessarily limited to a trailer, but any apparatus in which a hub bearing for rotatably supporting a rotating body, such as a rotating wheel of a vehicle may be applied to the present invention.

Figure 1:
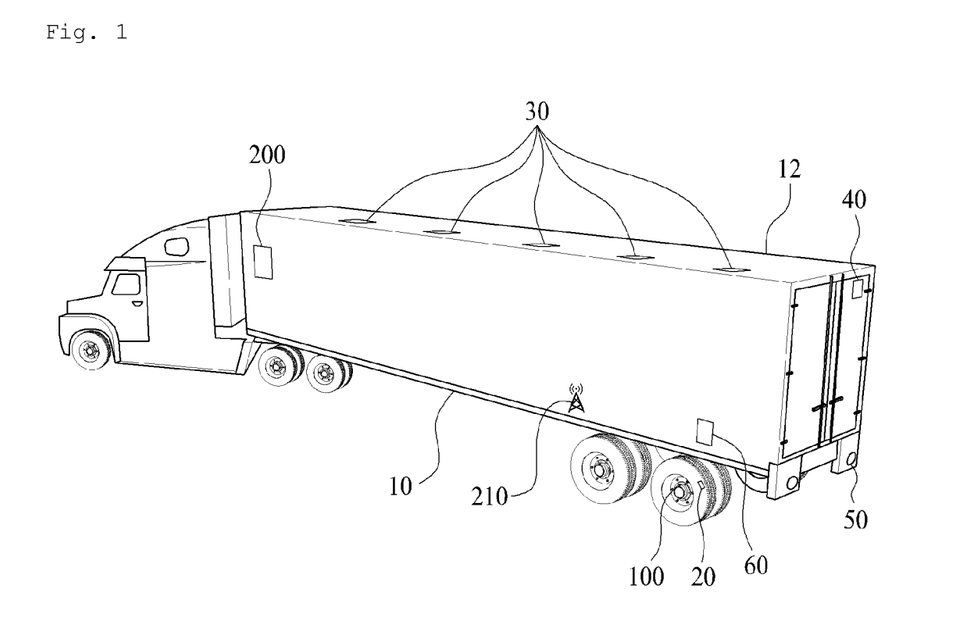
FIGS. 1 and 2 are views illustrating the kinds of various sensors provided in a container trailer.
Figure 2:
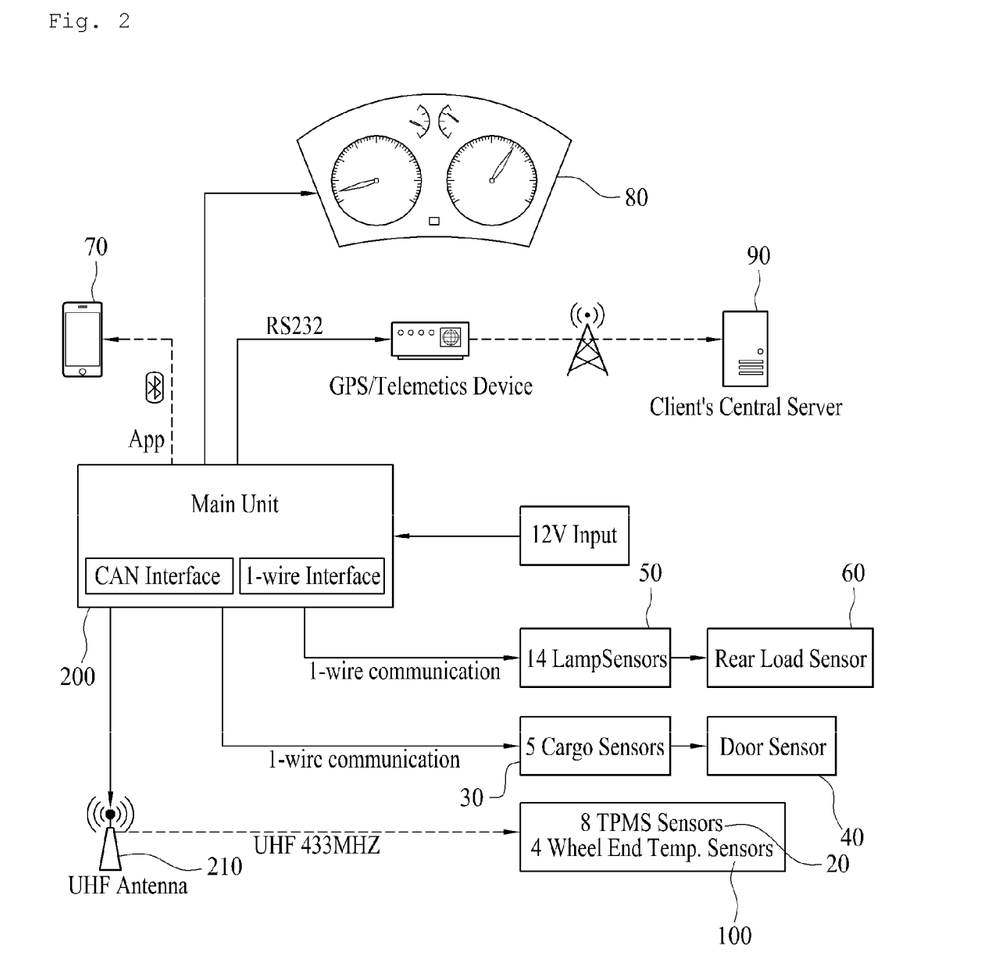

The trailer may employ various safety devices for safety, and as illustrated in FIGS. 1 and 2, the trailer may include various elements, such as a tire pressure measuring sensor (TPMS) 20, a rear load sensor 60, a lamp sensor 50, a door sensor 40, a cargo sensor 30, a wheel end temperature sensor (WETS) 100.

The tire pressure measuring sensor 20 is a sensor that always monitors a pressure of a tire and detects whether the pressure of the tire is less than a lower limit value or more than an upper limit value and informs of the fact when the pressure of the tire is less than the lower limit value or more than the upper limit value, and the rear load sensor 60 is a sensor that measures a load applied to a rear wheel of the trailer 10. The lamp sensor 50 is a sensor that informs of a short circuit or the like of various lamps of the trailer 10, and the door sensor 40 is a sensor that detects whether the door of the container 12 is opened. The cargo sensor 30 is a sensor that measures the amount, the volume, and the location of loads in the container 12.

Further, the wheel end temperature sensor 100 is a sensor that monitors the temperature of a hub bearing assembly of a wheel of the trailer 10.

In this way, the information measured by the various sensors may be transmitted to a main unit 200 by wire or wirelessly.

The main unit 200 may receive information measured by and transmitted from the various sensors, which may be transmitted to equipment such as a gauge plate 80 or a preregistered smartphone 70 of the driver or an external control room 90.

Further, the trailer 10 may be provided with a relay antenna 210, which may receive the information transmitted wirelessly from the various sensors, may amplify the received information, and may relay the amplified information to the main unit 200.

Meanwhile, the hub bearing assembly 300 according to the present invention will be described below.

Figure 3:
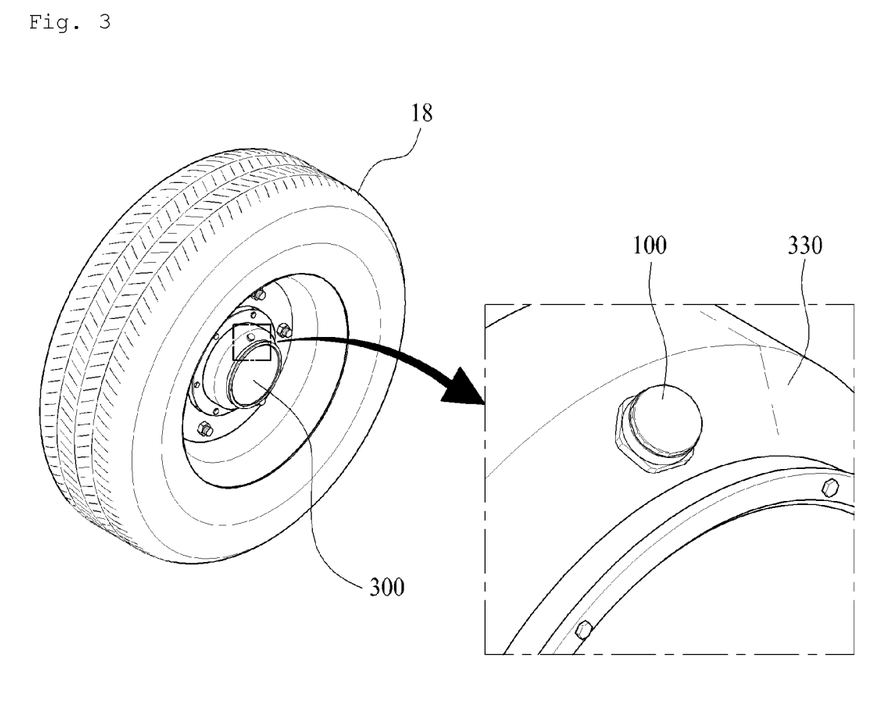
FIGS. 3 and 4 are views illustrating a wheel end temperature sensor provided in a hub bearing assembly of a wheel of a the container trailer of FIG. 1.
Figure 4:
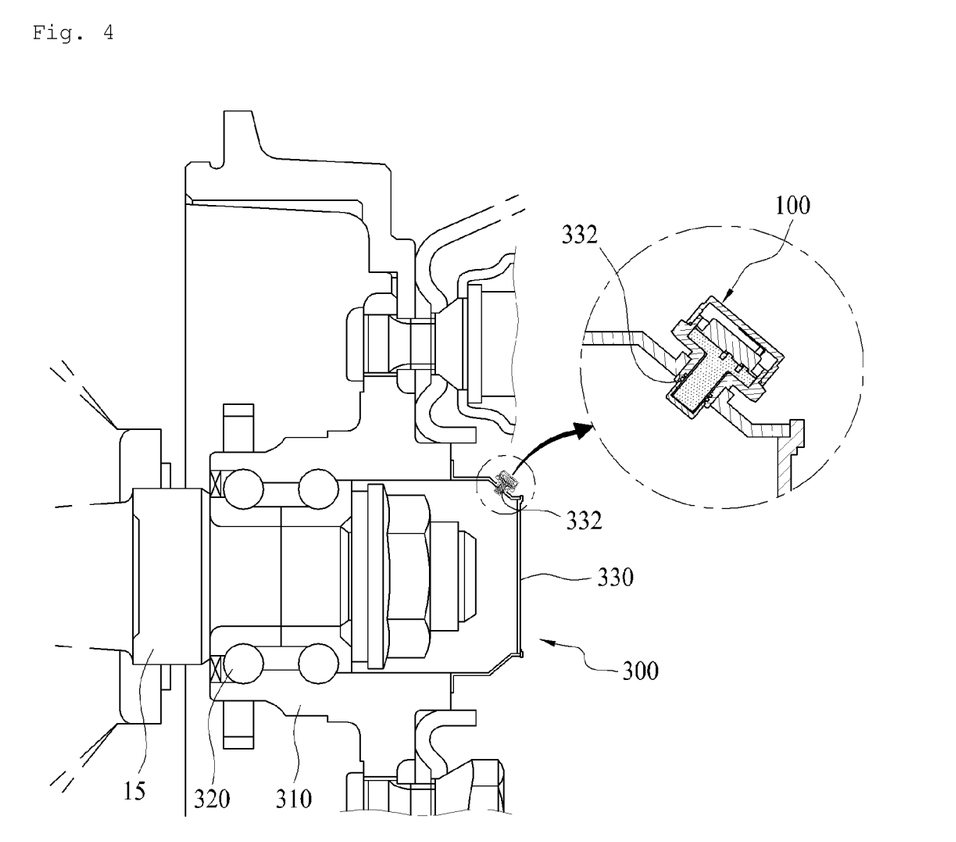

The hub bearing assembly 300 may be provided to rotatably couple a wheel 18 of the trailer 10. As illustrated in FIGS. 3 and 4, the hub bearing assembly 300 may include a hub housing 310, a bearing 320, a hub cap 330, and a wheel end temperature sensor 100.

The hub housing 310 is disposed to be concentric with a shaft of the wheel 18, and may be provided to surround an outer peripheral surface of an end of the shaft 15.

Further, a bearing 320 is provided between an outer peripheral surface of the shaft 15 and an inner peripheral surface of the hub housing 310 to rotatably support the hub housing 310.

Further, a lubricant such as grease may be filled between the hub housing 310 and the shaft 15 for lubrication of the bearing 320.

A hub cap 330 that seals a space between the bearing 320 and the hub housing 310, which is filled with oil, may be provided at an outer end of the hub housing 310 to prevent the grease from being leaked and prevent foreign substances from penetrating between the hub housing 310 and the shaft 15 at the same time.

Meanwhile, a separate drain hole 332 for supplementing or discharging the lubricant such as grease may be formed in the hub cap 330, and the wheel end temperature sensor 100 may be mounted in the drain hole 332.

If the drain hole 332 is not present in the hub cap 330, a separate hole for mounting the wheel end temperature sensor 100 may be formed.

The wheel end temperature sensor 100 is mounted to pass through the hub cap 330, and may measure the temperature of the oil or air in the space between the hub housing 310 and the hub cap 330.

If foreign substances, such as moisture, penetrates between the hub housing 310 and the shaft 15, the life span of the lubricant expires, or foreign substances such as sands penetrate in to the bearing 320 and the bearing 320 is damaged in spite that the hub cap 330 is provided, the temperature of the hub bearing assembly rapidly increases while the vehicle travels so that the bearing 320 may be fused.

Figure 5:
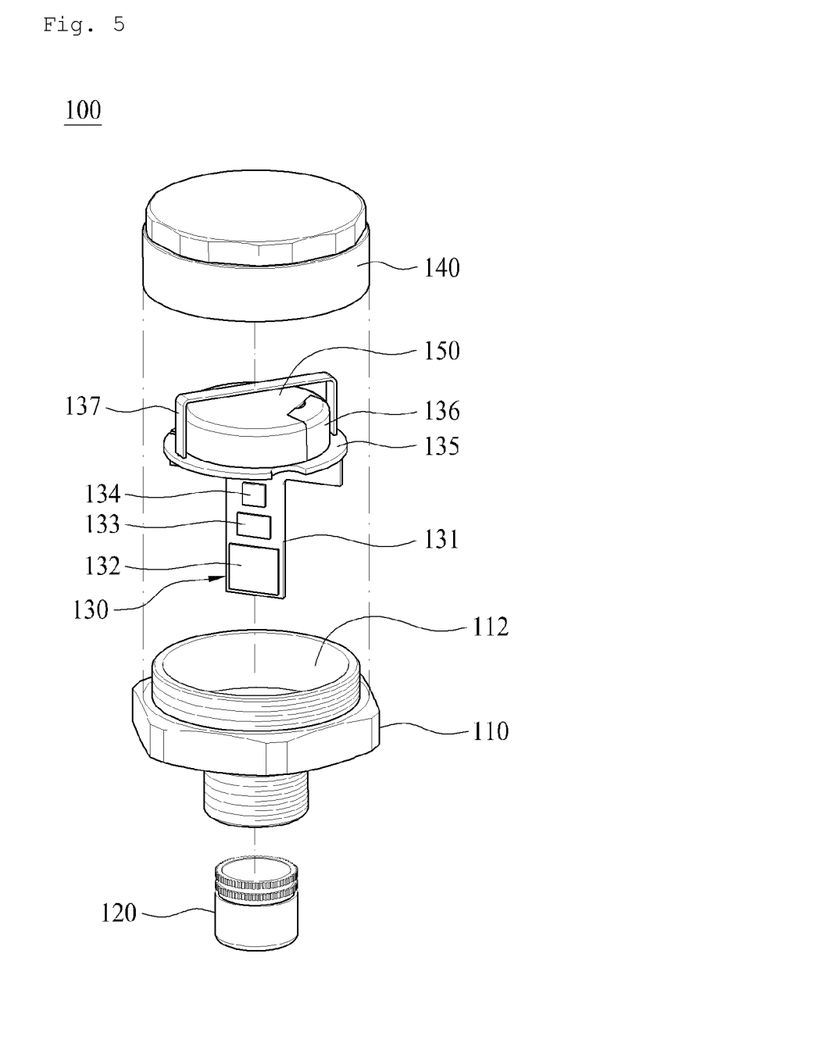
FIG. 5 is an exploded perspective view illustrating the wheel end temperature sensor of FIG. 4.
Figure 6:
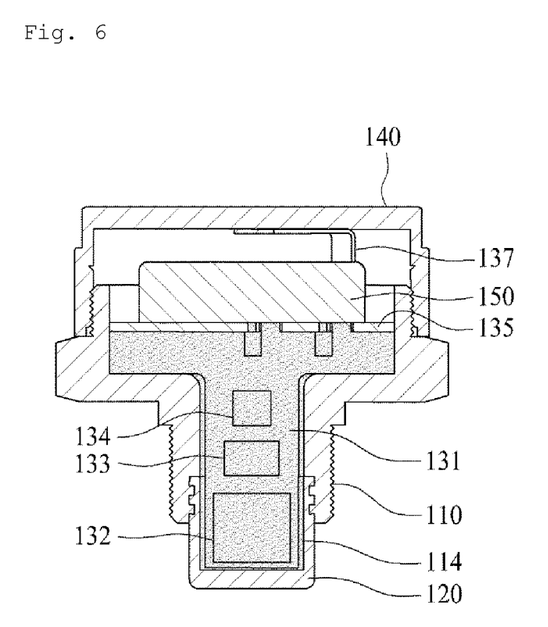
FIG. 6 is a sectional view illustrating the wheel end temperature sensor of FIG. 5.

As illustrated in FIGS. 5 and 6, the wheel end temperature sensor 100 may include an insertion part 110, a thermal conduction cap 120, a cap part 140, and a sensor board 130.

The insertion part 110 may be inserted through the hole 332 of the hub cap 330, and extend to the spaces of the hub cap 330 and the hub housing 310, which are filled with oil, after being inserted into the hole 332 of the hub cap 330, and a board accommodating space 112, in which the board is accommodated, may be formed in the interior of the insertion part 110.

Then, an end of the insertion part 110 is opened, and the thermal conduction cap 120 is coupled to the end of the insertion part 110 to be sealed so that the interior space of the insertion part 110 may be sealed from the outside.

Further, an outer peripheral surface of the insertion part 110 may have a screw thread or the like to be coupled to the hole 332 of the hub cap 330. Of course, a screw thread also may be formed on an inner peripheral surface of the hole 332, to which the insertion part 110 is coupled.

The thermal conduction cap 120 may be provided at an end of the insertion part 110, may be formed of a thermal conductive material, such as a metallic material, and may be formed to contact an inside of the board accommodating space 112 in the interior of the insertion part 110 and an outside of the insertion part 110 at the same time.

Further, the cap part 140 that closes the board accommodating space 112 may be coupled to an upper side of the insertion part 110.

Meanwhile, the sensor board 130 may be accommodated in the interior of the board accommodating space 112 of the insertion part 110. The sensor board 130 may be accommodated in the board accommodating space 112 of the insertion part 110, and temperature may be measured through heat conducted through the thermal conduction cap 120 and the measured temperature may be transmitted to the outside.

The sensor board 130 may include a main board 131, a temperature sensor 132, a battery board 135, an antenna 137, and a control unit 133

The main board 131 may be located in the board accommodating space 112 of the insertion part 110, and various parts and elements may be mounted on the main board 131.

One of the parts mounted on the main board 131 may be a temperature sensor 132.

The temperature sensor 132 may be a sensor that measures a peripheral temperature.

Further, the battery board 135 may be coupled to the main board 131. The battery board 135 may be provided on a side of the main board 131, which is opposite to the location of the temperature sensor, and a battery holder 136 for mounting a battery 150 may be mounted on the battery board 135.

Although it is illustrated in the embodiment that the battery 150 coupled to the battery holder 136 is a coil type battery, the present invention is not limited thereto and a battery of any known type may be mounted on the battery holder 136.

That is, electric power may be supplied to the components mounted on the main board 131 and the battery board 135 through the battery 150 coupled to the battery holder 136.

Further, an antenna 137 configured to transmit the temperature information measured by the temperature sensor 132 may be provided in any one of the main board 131 or the battery board 135.

A gyro sensor 134 that may detect whether the hub bearing 300 is rotated and the RPM of the hub bearing 300 may be provided in any one of the main board 131 and the battery board 135.

Further, a control unit 133 that may controls parts mounted on the main board 131 and the battery board 135 may be provided on the main board 131 or the battery board 135.

The temperature sensor 132 may be provided to contact the thermal conduction cap 120. Of course, the temperature sensor 132 may be mounted to be spaced apart from the thermal conduction cap 120 by a specific distance.

Further, an epoxy 114 may be filled in the interior of the board accommodation space 112, into which the sensor board 130 is inserted, to protect the sensor board 130 from various foreign substances and vibration.

Meanwhile, the control unit 133 may select an operating mode according to the RPM measured by the gyro sensor 134 or the temperature measured by the temperature sensor 132.

The operating mode may include a stop state mode, a driving state mode, and an alarm state mode, and the control unit 134 may select any one of the operating modes.

The stop state mode refers to a state in which the trailer 10 is stopped or moves at a low speed when the RPM measured by the gyro sensor 134 is 0 or less than a preset RPM, and then, the temperature information measured by the temperature sensor may be transmitted to the outside once per first period of time.

Then, the first period of time may be a preset time interval such as 30 minutes or 1 hour.

Here, the transmission to the outside may refer to transmission to the main unit 200.

Further, the driving state mode refers to a state in which the trailer 10 moves at a preset speed or higher when the RPM measured by the gyro sensor 134 is not less than a preset RPM, and then, the temperature information measured by the temperature sensor may be transmitted to the outside once per second period of time.

Then, the second period of time may be a preset time interval such as 5 minutes or 10 minutes, and may be shorter than the first period of time.

Meanwhile, the alarm state mode refers to a state in which the hub bearig assembly 300 is overheated when the temperature measured by the temperature sensor 132 is a preset temperature or higher, and then, the temperature information measured by the temperature sensor 132 may be transmitted to the outside once per third period of time.

Then, the third period of time may be a preset time interval such as 1 minute or 30 seconds, and may be shorter than the second period of time.

Accordingly, an accident may be prevented by monitoring the temperature of the hub bearing assembly and recognizing an overheating situation in advance.

According to the wheel end temperature sensor and the wheel end temperature monitoring system including the same according to the present invention, because the temperature of the hub bearing of the trailer that travels in a severe environment, an accident may be prevented by discovering an abnormality of the hub bearing in advance.

The aspect of the present invention is not limited thereto, and other unmentioned aspects of the present invention may be clearly appreciated by those skilled in the art from the following descriptions.

Until now, the embodiments of the present invention have been discussed, and it is noted by an ordinary person in the art to which the present invention pertains that the present invention may be embodied in other specific forms without departing from the purpose or categories of the present invention, in addition to the above-mentioned embodiments. Therefore, the above-mentioned embodiments are not restrictive but exemplary, and accordingly, the present invention is not limited to the above description but may be modified within the categories of the claims and the equivalent ranges thereof.

What is claimed is:

1. A wheel end temperature monitoring system, comprising:
   a wheel end temperature sensor configured to detect the temperature of a hub bearing of a wheel of a trailer; and
   a main unit configured to receive a signal of the wheel end temperature sensor and transmit the received signal to the outside,
   wherein the wheel end temperature sensor includes:
   an insertion part mounted to pass through a hub cap, extending to an oil filling space between the hub cap and a housing in a state in which the insertion part is mounted on the hub cap, and having a board accommodating space in an interior thereof;
   a thermal conduction cap provided at an end of the insertion part, formed of a metallic material, and contacting an outside and an inside of the board accommodating space;
   a cap part coupled to an upper side of the insertion part and configured to close a board accommodating space; and
   a sensor board accommodated in the board accommodating space of the insertion part, configured to measure temperature through heat conducted through the thermal conduction cap, and configured to transmit the measured temperature to the outside.

2. The wheel end temperature monitoring system of claim 1, further comprising:
   a relay antenna configured to relay the signal of the temperature sensor to the main unit.

3. The wheel end temperature monitoring system of claim 1, wherein the main unit transmits the received signal of the wheel end temperature sensor to at least any one of a vehicle gauge plate, a registered signal reception device, a registered mobile phone, or an external control room.

4. A hub bearing assembly comprising:
   a hub bearing disposed to be concentric with a shaft and provided at an end of the shaft;
   a bearing provided between the shaft and the hub housing;
   a hub cap provided at an outer end of the housing and sealing a space between the bearing and the housing, which is filled with oil; and
   a wheel end temperature sensor mounted to pass through the hub cap and configured to measure the temperature of the oil in the space between the housing and the hub cap,
   wherein the wheel end temperature sensor includes:
   an insertion part mounted to pass through a hub cap, extending to an oil filling space between the hub cap and a housing in a state in which the insertion part is mounted on the hub cap, and having a board accommodating space in an interior thereof;
   a thermal conduction cap provided at an end of the insertion part, formed of a metallic material, and contacting an outside and an inside of the board accommodating space;
   a cap part coupled to an upper side of the insertion part and configured to close a board accommodating space; and
   a sensor board accommodated in the board accommodating space of the insertion part, configured to measure temperature through heat conducted through the thermal conduction cap, and configured to transmit the measured temperature to the outside.

5. The hub bearing assembly of claim 4, wherein a mounting hole, through which the wheel end temperature sensor is mounted to pass, is formed in the hub cap.

6. A wheel end temperature sensor comprising:
   an insertion part inserted into a hub cap, extending to an oil filling space between the hub cap and a housing in a state in which the insertion part is inserted into the hub cap, and having a board accommodating space in an interior thereof;
   a thermal conduction cap provided at an end of the insertion part, formed of a metallic material, and contacting an outside and an inside of the board accommodating space;
   a cap part coupled to an upper side of the insertion part and configured to close a board accommodating space; and
   a sensor board accommodated in the board accommodating space of the insertion part, configured to measure temperature through heat conducted through the thermal conduction cap, and configured to transmit the measured temperature to the outside.

7. The wheel end temperature sensor of claim 6, wherein an end of the insertion part is opened and the opened end of the thermal conduction cap is coupled to be sealed.

8. The wheel end temperature sensor of claim 6, wherein the sensor board includes:
   a main board located in the board accommodating space of the insertion part;
   a temperature sensor mounted on the main board;

a battery board coupled to the main board and on which a battery holder is mounted; and an antenna mounted on any one of the main board and the battery board and configured to transmit the temperature information measured by the temperature sensor to the outside.

9. The wheel end temperature sensor of claim 8, wherein the temperature sensor contacts the thermal conduction cap.

10. The wheel end temperature sensor of claim 8, wherein an epoxy is filled in the inside of the board accommodating space, into which the sensor board is inserted.

11. The wheel end temperature sensor of claim 8, wherein a gyro sensor configured to detect rotation and RPM is further included in the sensor board.

12. The wheel end temperature sensor of claim 11, wherein a control unit configured to control the temperature sensor, an antenna, and a gyro sensor is further included in the sensor board, and wherein the control unit selects an operating mode according to the RPM measured by the gyro sensor or the temperature measured by the temperature sensor.

13. The wheel end temperature sensor of claim 12, wherein the wheel end temperature sensor is operated in a stop state mode in which the temperature information measured by the temperature sensor is transmitted once per first period of time when the RPM measured by the gyro sensor is a preset RPM or lower.

14. The wheel end temperature sensor of claim 12, wherein the wheel end temperature sensor is operated in a driving state mode in which the temperature information measured by the temperature sensor is transmitted once per second period of time when the RPM measured by the gyro sensor is a preset RPM or higher.

15. The wheel end temperature sensor of claim 12, wherein the wheel end temperature sensor is operated in an alarm state mode in which the temperature information measured by the temperature sensor is transmitted once per third period of time when the temperature measured by the temperature sensor is a preset temperature or higher.

* * * * *